(12) United States Patent
Lin

(10) Patent No.: US 9,500,863 B2
(45) Date of Patent: Nov. 22, 2016

(54) VEHICLE HEAD-UP DISPLAY DEVICE

(71) Applicant: Yu-Chen Lin, Hsinchu (TW)

(72) Inventor: Yu-Chen Lin, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 0 days.

(21) Appl. No.: 14/610,563

(22) Filed: Jan. 30, 2015

(65) Prior Publication Data

US 2016/0223814 A1 Aug. 4, 2016

(51) Int. Cl.
*G02B 27/14* (2006.01)
*G02B 27/01* (2006.01)

(52) U.S. Cl.
CPC ..... *G02B 27/0101* (2013.01); *G02B 2027/013* (2013.01)

(58) Field of Classification Search
USPC .............................................. 359/630–635
See application file for complete search history.

(56) References Cited

U.S. PATENT DOCUMENTS

| | | |
|---|---|---|
| 6,504,518 B1 | 1/2003 | Kuwayama et al. |
| 7,271,960 B2 | 9/2007 | Stewart et al. |
| 7,397,606 B1 | 7/2008 | Peng et al. |
| 7,688,516 B2 | 3/2010 | Choi et al. |
| 8,830,588 B1 | 9/2014 | Brown et al. |
| 2006/0072205 A1* | 4/2006 | Li ..................... G02B 27/0172 359/630 |
| 2008/0002262 A1* | 1/2008 | Chirieleison ...... G02B 27/0093 359/630 |
| 2012/0224062 A1 | 9/2012 | Lacoste et al. |
| 2013/0038935 A1 | 2/2013 | Moussa et al. |
| 2016/0004077 A1* | 1/2016 | Yanagisawa ........... B60K 35/00 359/633 |

* cited by examiner

*Primary Examiner* — Mohammed Hasan
(74) *Attorney, Agent, or Firm* — Muncy, Geissler, Olds & Lowe, P.C.

(57) ABSTRACT

A vehicle head-up display device includes a pattern generation unit and a combiner comprised of a free-form surface lens. The pattern generation unit forms at least one image, and the combiner magnifies and reflects the image of the pattern generation unit to provide a virtual image. The combiner has a dynamic distortion of smaller than 0.4%, and the dynamic distortion is an average value of a maximum horizontal dynamic distortion and a maximum vertical dynamic distortion.

20 Claims, 12 Drawing Sheets

VEHICLE HEAD-UP DISPLAY DEVICE

BACKGROUND OF THE INVENTION

1. Field of the Invention

The invention relates generally to a head-up display device and, more particularly, to a head-up display device used in a vehicle.

2. Description of the Related Art

A vehicle head-up display device may display vehicle driving data or other data in a main line of a driver's sight. Therefore, the driver may perceive important driving data and meanwhile keeping his eyes on the road to thus realize safe driving. Typically, a combiner that is allowed to provide a magnified image to a driver for a given field of view (FOV) is a critical component for a head-up display device. Therefore, it is important to optimize design parameters of the combiner to improve the optical efficiency and imaging quality of the vehicle head-up display device.

BRIEF SUMMARY OF THE INVENTION

According to one aspect of the present disclosure, a vehicle head-up display device includes a pattern generation unit and a combiner comprised of a free-form surface lens. The pattern generation unit forms at least one image, and the combiner magnifies and reflects the image on the pattern generation unit to provide a virtual image. The combiner has a dynamic distortion of smaller than 0.4%, with the dynamic distortion being an average value of a maximum horizontal dynamic distortion and a maximum vertical dynamic distortion. The combiner also satisfies the condition $1.97 \leq Vh/Ch \leq 1.99$ or $2.01 \leq Vh/Ch \leq 2.09$, where Ch denotes a width of the combiner and Vh denotes a width of the virtual image measured in the same horizontal plane as the width of the combiner.

According to another aspect of the present disclosure, a vehicle head-up display device includes a pattern generation unit and a combiner comprised of a free-form surface lens. The pattern generation unit forms at least one image, and the combiner magnifies and reflects the image of the pattern generation unit to provide a virtual image. The combiner has a dynamic distortion of smaller than 0.4%, with the dynamic distortion being an average value of a maximum horizontal dynamic distortion and a maximum vertical dynamic distortion. The combiner also satisfies the condition $3.63 \leq Vh/Ch \leq 4.16$ or $4.17 \leq Vh/Ch \leq 4.85$, where Ch denotes a width of the combiner and Vh denotes a width of the virtual image measured in the same horizontal plane as the width of the combiner.

According to another aspect of the present disclosure, a combiner for a vehicle head-up display device includes a free-form surface lens for magnifying and reflecting an image projected from a pattern generation unit to provide a virtual image outside a vehicle. The combiner has a dynamic distortion of smaller than 0.4%, the dynamic distortion is an average value of a maximum horizontal dynamic distortion and a maximum vertical dynamic distortion, the horizontal dynamic distortion is obtained by measuring variations in horizontal lengths of different images formed on the combiner corresponding to different viewpoints in an eye-box, and the vertical dynamic distortion is obtained by measuring variations in vertical lengths of the different images formed on the combiner corresponding to the different viewpoints in the eye-box.

According to the above embodiments, as compared with a spherical surface lens or an aspheric surface lens, the combiner comprised of a free-form surface lens is allowed to minimize the size of light spots to increase the resolution of the virtual image seen by the observer and reduce the dynamic distortion among different viewpoints in an eye-box. Therefore, when the observer freely moves to different positions of the eye-box, he may correctly recognize the displayed information because the symbols, numbers and letters displayed on the virtual image may maintain their original geometrical rationality. Besides, an efficiency factor as well as its proper range is defined for the free-form combiner to optimize the size of the combiner and the scope of the virtual image.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled,"

and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
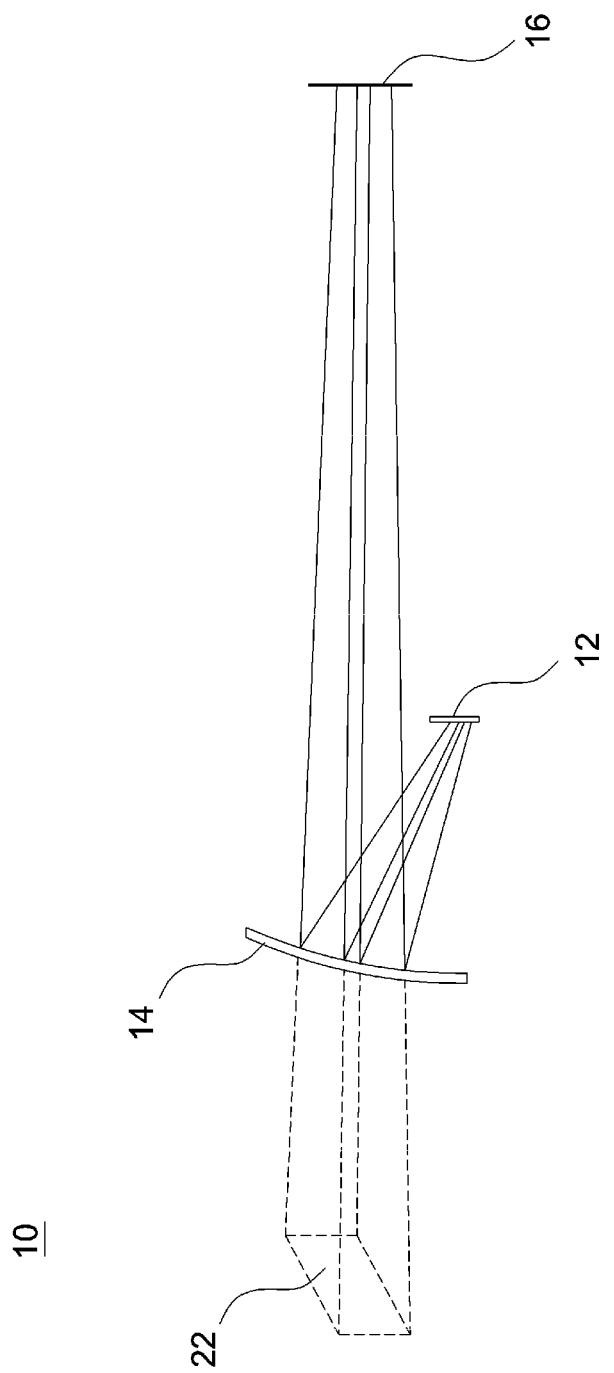
FIG. 1 shows a schematic view of a vehicle head-up display device according to an embodiment of the invention.
Figure 2:
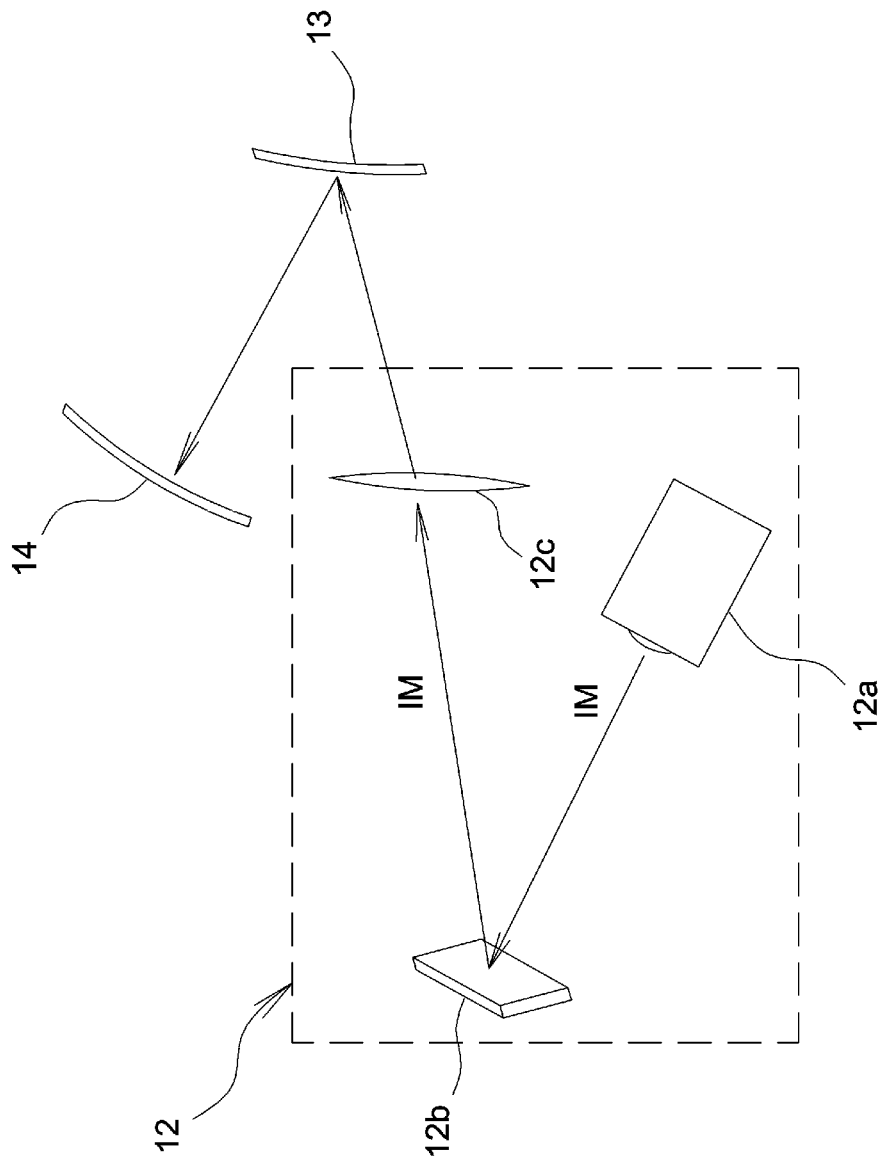
FIG. 2 shows a schematic view of a pattern generation unit according to an embodiment of the invention.

FIG. 1 shows a schematic view of a vehicle head-up display device according to an embodiment of the invention. Referring to FIG. 1, a vehicle head-up display device 10 includes a pattern generation unit 12 and a combiner 14. The pattern generation unit 12 forms at least one image in response to image data and projects the image onto the combiner 14. The combiner 14 magnifies and reflects the image of the pattern generation unit 12 to allow an observer 16 to see a virtual image 22 formed in the observer's line of sight for a given field of view (FOV). The pattern generation unit 12 is not limited to a specific construction or arrangement, as long as it may cast an image on the combiner 14. In one embodiment, the pattern generation unit 12 may be any one of emission type, transmission type, and reflection type displays. The emission type display may include an organic EL or an inorganic EL, the transmission type display may include an LCD, and the reflection type display may include a DLP or an LCOS. In an alternate embodiment, as shown in FIG. 2, the pattern generation unit 12 may be an optics assembly including an optical projection engine 12a, a flat mirror 12b and a diffuser 12c. The optical projection engine 12a may emit an image beam IM that is reflected by the flat mirror 12b and passes through the diffuser 12c. In an alternate embodiment, the diffuser 12c may reflect the image beam IM but not transmit the image beam IM. The image beam IM diffused by the diffuser 12c may be further deflected by a curve mirror 13 to the combiner 14. Alternatively, the curve mirror 13 may be omitted from the head-up display device 10. In this embodiment, the combiner 14 may include a free-form surface lens, and the term "free-form surface lens" means a lens having a free-form surface that may be formed by digital manufacturing processes. The free-form surface may satisfy the following equation:

$$Z = \frac{cr^2}{1+\sqrt{1-(1+k)c^2r^2}} + \sum_{i=1}^{N} A_i E_i(x, y),$$

where Z is high vector, c is a vertex radius of curvature, k is a conical coefficient, r is a height away from the optical axis, Ai denotes polynomial coefficients, and Ei (x, y) denotes x and y series polynomials.

The values of free-form surface polynomial coefficients are exemplified in the following examples.

Example 1

$$\sum_{i=1}^{N} A_i E_i(x, y) = A10^*X + A01^*Y + A20^*X^{\wedge}2 + A11^*X^*Y + A02^*Y^{\wedge}2 +$$
$$A30^*X^{\wedge}3 + A21^*X^{\wedge}2^*Y + A12^*X^*2^{\wedge}Y + A03^*Y^{\wedge}3 + A40^*X^{\wedge}4 +$$
$$A31^*X^{\wedge}3^*Y + A22^*X^{\wedge}2^*Y^{\wedge}2 + A13^*X^*Y^{\wedge}3 + A04^*Y^{\wedge}4 +$$
$$A50^*X^{\wedge}5 + A41^*X^{\wedge}4^*Y + A32^*X^{\wedge}3^*Y2 + A23^*X^{\wedge}2^*Y^{\wedge}3 +$$
$$A14^*X^*Y^{\wedge}4 + A05^*Y^{\wedge}5 + A60^*X^{\wedge}6 + A51^*X^{\wedge}5^*Y + A42^*X^{\wedge}4^*Y2 +$$
$$A33^*X^{\wedge}3^*Y^{\wedge}3 + A24^*X^{\wedge}2^*Y^{\wedge}4 + A15^*X^*Y^{\wedge}5 + A06^*Y^{\wedge}6;$$

where C=0; K=0; A10=−2.131984 E-05; A01=−6.946561 E-02; A20=1.608551 E-03; A11=1.846569 E-06; A02=1.396711 E-03; A30=2.985962 E-09; A21=−2.526717 E-06; A12=5.478431 E-09; A03=−2.224568 E-06; A40=−2.012085 E-09; A31=9.623426 E-12; A22=−1.435849 E-09; A13=−8.901616 E-11; A04=1.212048 E-09; A50=−6.721706 E-013; A41=−1.735875 E-011; A32=3.746385 E-12. Note some polynomial coefficients (such as A42, A51 . . . ) that are recited in the polynomial of Example 1 but do not show their values above have a value of zero(=0).

Example 2

$$\sum_{i=1}^{N} A_i E_i(x, y) = A10^*X + A01^*Y + A20^*X^{\wedge}2 + A11^*X^*Y + A02^*Y^{\wedge}2 +$$
$$A30^*X^{\wedge}3 + A21^*X^{\wedge}2^*Y + A12^*X^*Y^{\wedge}2 + A03^*Y^{\wedge}3 + A40^*X^{\wedge}4 +$$
$$A31^*X^{\wedge}3^*Y + A22^*X^{\wedge}2^*Y^{\wedge}2 + A13^*X^*Y^{\wedge}3 + A04^*Y^{\wedge}4 +$$
$$A50^*X^{\wedge}5 + A41^*X^{\wedge}4^*Y + A32^*X^{\wedge}3^*Y2 + A23^*X^{\wedge}2^*Y^{\wedge}3 +$$
$$A14^*X^*Y^{\wedge}4 + A05^*Y^{\wedge}5 + A60^*X^{\wedge}6 + A51^*X^{\wedge}5^*Y + A42^*X^{\wedge}4^*Y2 +$$
$$A33^*X^{\wedge}3^*Y^{\wedge}3 + A24^*X^{\wedge}2^*Y^{\wedge}4 + A15^*X^*Y^{\wedge}5 + A06^*Y^{\wedge}6;$$

where C=0; K=0; A01=−2.99502 E-02; A20=8.10697 E-04; A02=7.99117 E-04; A21=0.70178 E-06; A03=0.77342 E-06. Note some polynomial coefficients (such as A11, A13, A30 . . . ) that are recited in the polynomial of Example 2 but do not show their values above have a value of zero(=0).

Figure 3A:
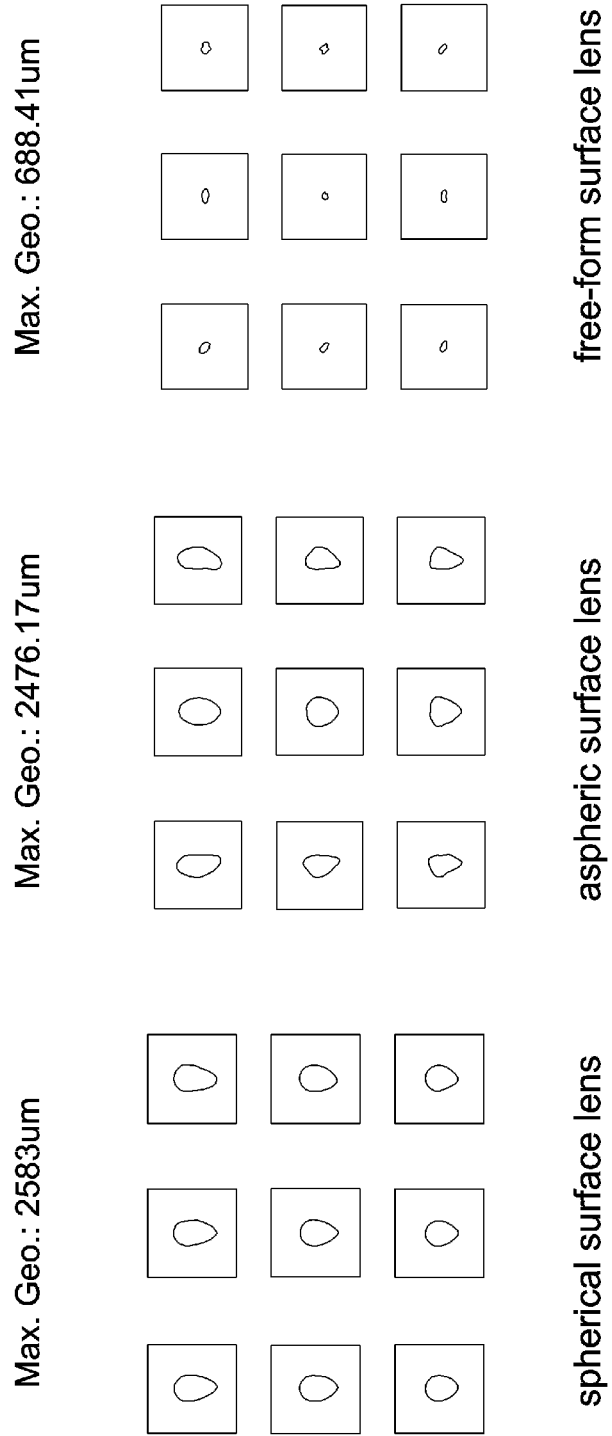
FIG. 3A shows a diagram illustrating simulations results of spot size for a spherical surface lens, an aspheric surface lens and a free-form surface lens.

The combiner 14 is concave for magnifying an image formed by the pattern generation unit 12 by optical power. In one embodiment, the free-form surface lens of the combiner 14 is applied with a coating to have a reflectance of 30%-50%. FIG. 3A illustrates simulations results of spot size for a spherical surface lens, an aspheric surface lens and a free-form surface lens. As shown in FIG. 3A, each lens is measured at nine different positions to show nine different spots, a maximum spot diameter of the nine spots for the spherical surface lens is 2583 um, 2476.17 um for the aspheric surface lens, and 688.41 um for the free-form surface lens. Therefore, the combiner 14 comprised of a free-form surface lens is allowed to minimize the size of light spots to increase the resolution of the virtual image 22 seen by the observer 16, as compared with a spherical surface lens or an aspheric surface lens.

Figure 3B:
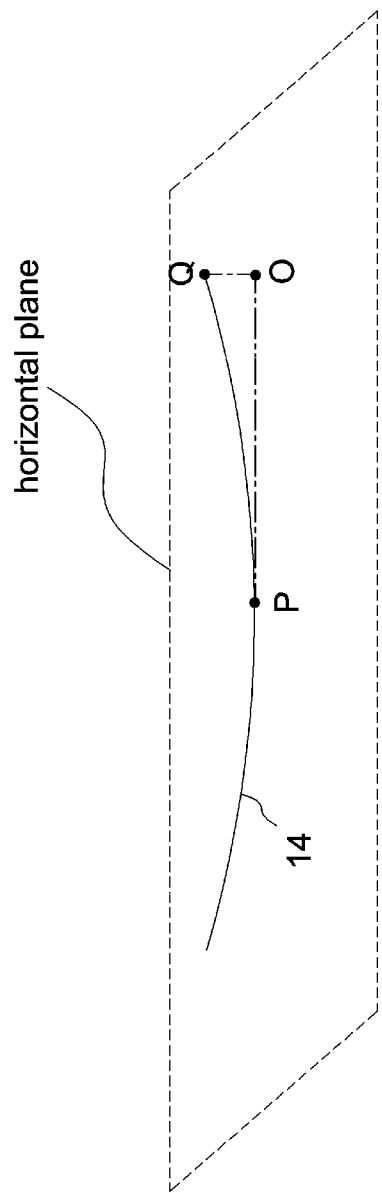
FIG. 3B shows a schematic diagram illustrating the slope of a combiner according to an embodiment of the invention.

FIG. 3B shows a schematic diagram illustrating the slope of a combiner according to an embodiment of the invention. As shown in FIG. 3B, the slope S of the combiner 14 can be defined as a length of a vertical segment QO divided by a length of a horizontal segment PO, where the horizontal segment PO is a projection length of a distance between a vertex point P and an end point Q of the combiner 14 on a horizontal plane, and the vertical segment QO is a distance between the end point Q and a point O, with the point O being a projection point of the end point Q on the horizontal plane. In one embodiment, the slope S is no more than 0.174 (S≤0.174), where the slope S may affect, for example, the scope of a virtual image, the image distortion or the fabrication complexity of a combiner.

Figure 4:
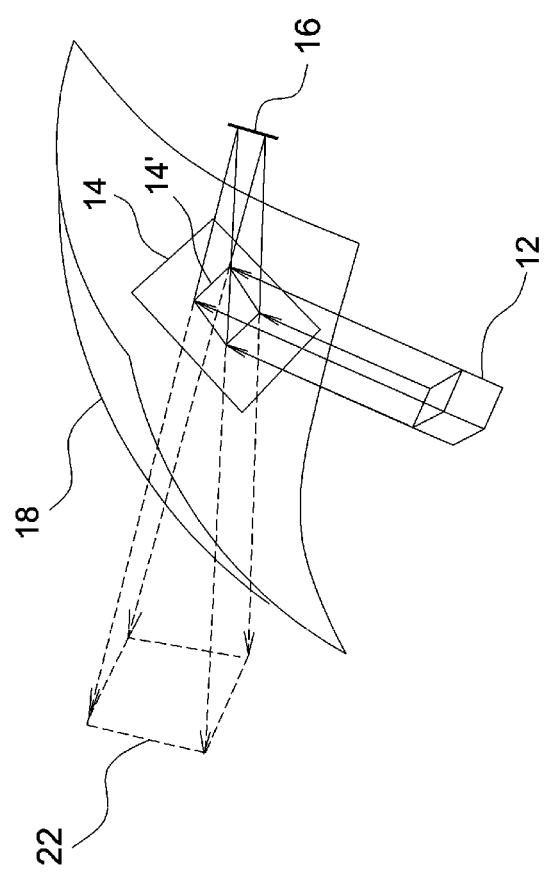
FIG. 4 shows another schematic view of a vehicle head-up display device according to an embodiment of the invention.

Referring to FIG. 4, an image projected from the pattern generation unit 12 creates an image 14' on the free-form combiner 14. Then, the image 14' reflected by the combiner 14 and is projected to an observer 16 such that the virtual image 22 is created outside a wind shield 18 of a vehicle. In one embodiment, the pattern generation unit 12 and the combiner 14 are integrated in a single housing (not shown) to form a compact assembly. Preferably, the virtual image 22 at the outside of a vehicle coincides with a visual field of a driver (observer 16). Further, the position of the virtual image 22 may vary according to the size of the vehicle and a position in which the head-up display device 10 is located. Thus, a clear virtual image may be formed in a proper position outside the vehicle by regulating a distance between the pattern generation unit 12 and the combiner 14.

Figure 5A:
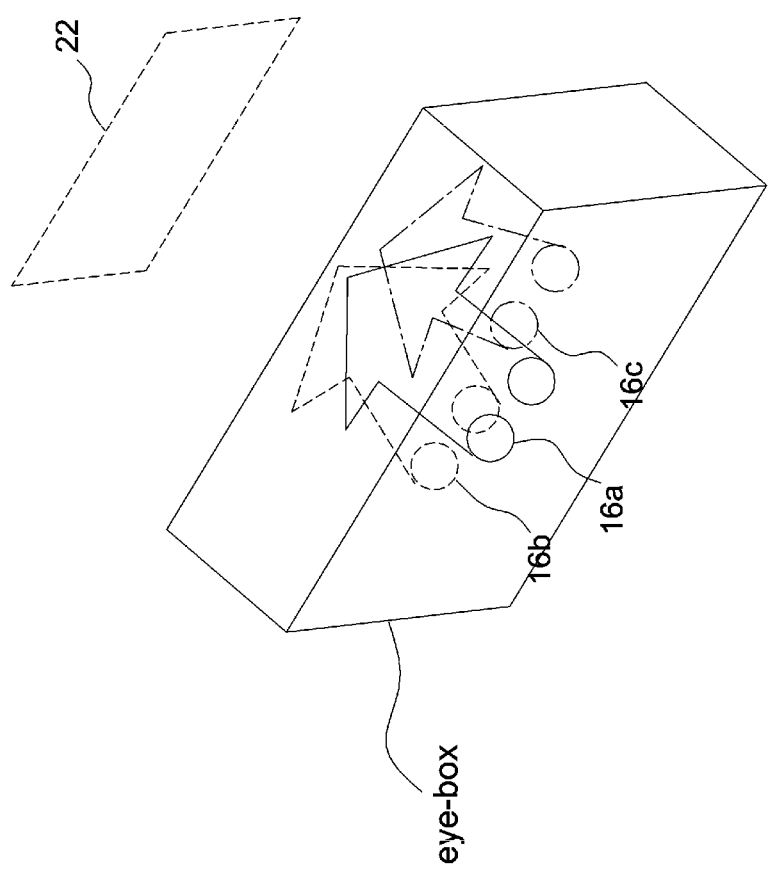
FIG. 5A shows a schematic diagram illustrating different viewpoints of an observer in an eye-box.
Figure 5B:
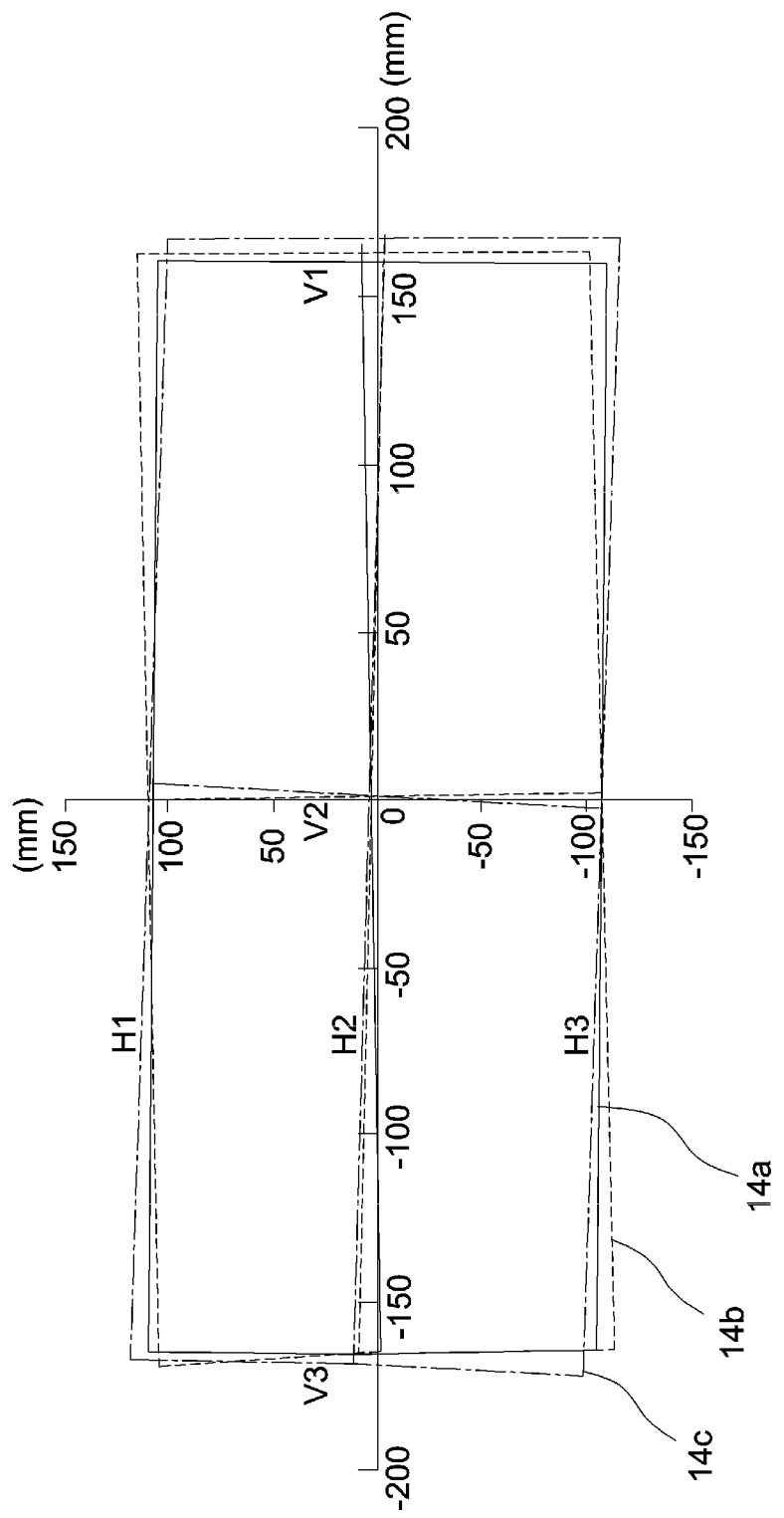
FIG. 5B shows images formed on a combiner corresponding to the different viewpoints of FIG. 5A in the eye-box.

Further, since the observer 16 may move his head freely within an eye-box, an image distortion may occur and becomes remarkably noticeable when his eyes are positioned more far away a central region of the eye-box. As shown in FIG. 5A, for example, the position of an observer's eyes may be changed among positions 16a, 16b and 16c, where the position 16a near a central region of the eye-box, and the position 16c is farther away the position 16a compared with the position 16b. In response to the different positions 16a, 16b and 16c where an observer's eyes is located, images 14a, 14b and 14c on the combiner 14 that distort to different extents are shown in FIG. 5B. As shown in FIG. 5B, in one embodiment, each of the images 14a, 14b and 14c formed on the combiner 14 respectively corresponding to the positions 16a, 16b and 16c in an eye-box is measured with respect to three horizontal lengths H1 (top), H2 (middle) and H3 (bottom) and three vertical lengths V1 (right), V2 (middle) and V3 (left). Here, a horizontal dynamic distortion DHn of the combiner 14 is defined as: DHn=[Max (Hn)−Min (Hn)]/Max (Hn), and a vertical dynamic distortion of a combiner 14 is defined as: DVn=[Max (Vn)−Min (Vn)]/Max (Vn), where n is a positive integer, Max (Hn) is a maximum horizontal length of the horizontal lengths Hn of the images 14a, 14b and 14c, Min (Hn) is a minimum horizontal length of the horizontal lengths Hn of the images 14a, 14b and 14c, Max (Vn) is a maximum vertical length of the vertical lengths Vn of the images 14a, 14b and 14c, and Min (Vn) is a minimum vertical length of the vertical lengths Vn of the images 14a, 14b and 14c. Note the number of sampled images is not limited to three (images 14a, 14b and 14c in this example) and may vary in accordance with actual needs. The detailed data of the dynamic distortion for a spherical combiner, an aspheric combiner and a free-form combiner are shown in Table 1 below.

TABLE 1

|  | spherical | aspheric | Free-form |
| --- | --- | --- | --- |
| DH1 | 0.47% | 0.62% | 0.37% |
| DH2 | 0.45% | 1.13% | 0.19% |
| DH3 | 0.42% | 1.02% | 0.38% |
| DV1 | 0.82% | 0.35% | 0.21% |
| DV2 | 0.88% | 0.87% | 0.38% |
| DV3 | 0.94% | 1.69% | 0.22% |
| Dmax | 0.705% | 1.41% | 0.38% |

Here we define a dynamic distortion Dmax for a lens surface as an average value of a maximum value among the horizontal dynamic distortions DH1, DH2 and DH3 and a maximum value among the vertical dynamic distortions DV1, DV2 and DV3, with the horizontal and vertical dynamic distortion measured at different positions (H1, H2, H3, V1, V2 and V3) of different images on a lens surface (corresponding to different viewpoints in an eye-box). As can be clearly seen in Table 1, the dynamic distortion Dmax of the free-form combiner 14 can be reduced to smaller than 0.4%, which is far lower as compared with a spherical combiner and an aspheric combiner.

Figure 6A:
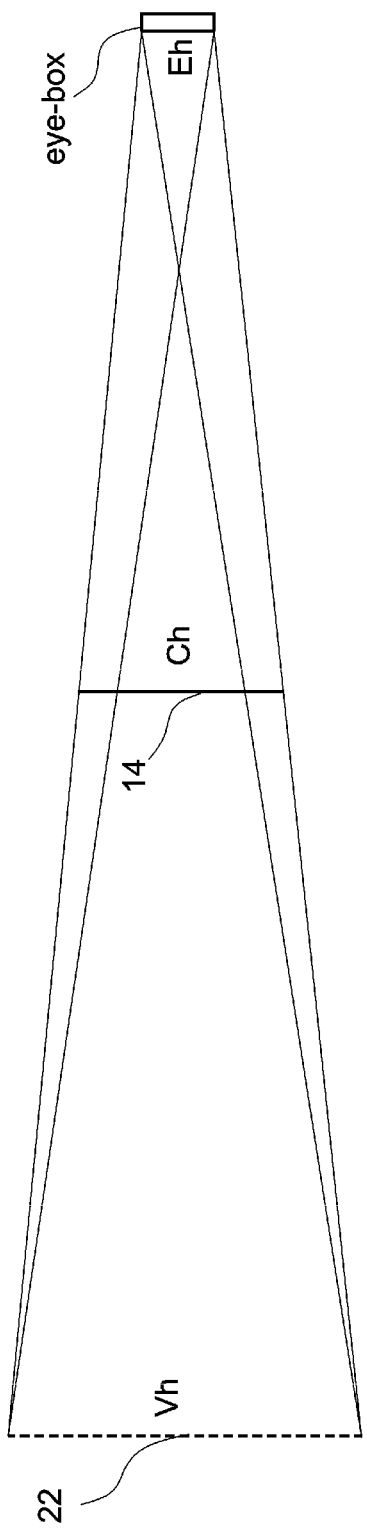
FIGS. 6A and 6B show schematic diagrams illustrating scale relationships of a combiner and a virtual image.
Figure 6B:
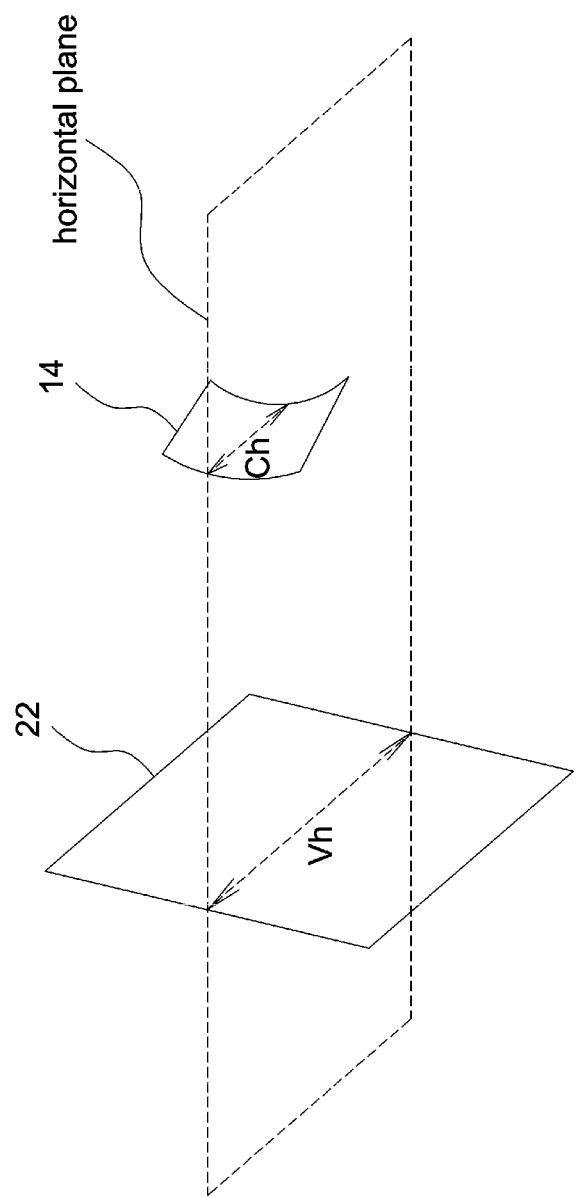

Typically, because the room for accommodating a head-up display device inside a vehicle such as a car is limited, it is better to minimize the size of the combiner 14 as far as possible. In contrast, it is better to increase the scope of a projected virtual image 22 to more clearly display the required information. Therefore, as shown in FIG. 6A and FIG. 6B, an efficiency factor Gh is defined as a width Vh of the virtual image 22 divided by a width Ch of the combiner 14 (Gh=Vh/Ch), and, for example, the width Vh of the virtual image 22 is measured in the same horizontal plane as the width Ch of the combiner 14. Thus, a larger value of the efficiency factor Gh means the vehicle head-up display device 10 may have a smaller combiner 14 and a broader virtual image 22.

Figure 7A:
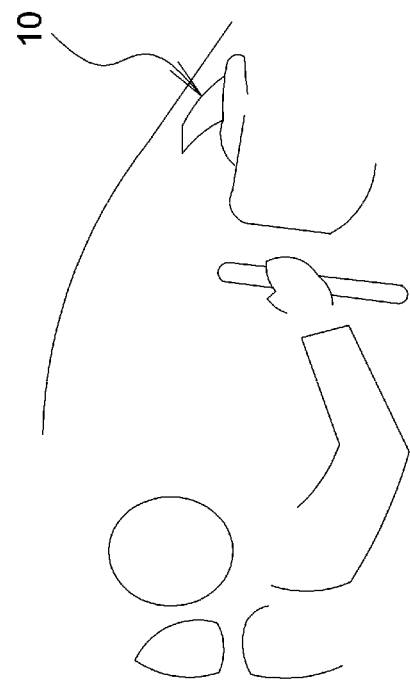
FIGS. 7A, 7B, 8A, and 8B show schematic diagrams illustrating different mounting positions of a head-up display device in a vehicle.

In one embodiment, a vehicle such as a car may be equipped with the vehicle head-up display device 10 through dash mounting, as shown in FIG. 7A, and the dash-mounting head-up display device 10 may support a horizontal field of view of 2-10 degrees. For example, the head-up display device 10 may support a horizontal field of view of about 3 degrees, a horizontal width Eh of an eye-box is about 100 mm, a width Ch of the combiner 14 is about 145.72-156.33 mm, and a width Vh of the virtual image 22 is about 303.97-313.45 mm. Therefore, the efficiency factor Gh for a free-form combiner 14 may be in the range of 1.97≤Vh/Ch≤1.99. In another example, the head-up display device 10 may support a horizontal field of view of about 3 degrees, a horizontal width Eh of an eye-box is about 100 mm, a width Ch of the combiner 14 is about 157.33-169.89 mm, and a width Vh of the virtual image 22 is about 315.45-335.41 mm. Therefore, the efficiency factor Gh for a free-form combiner 14 may be in the range of 2.01≤Vh/Ch≤2.09.

Figure 7B:
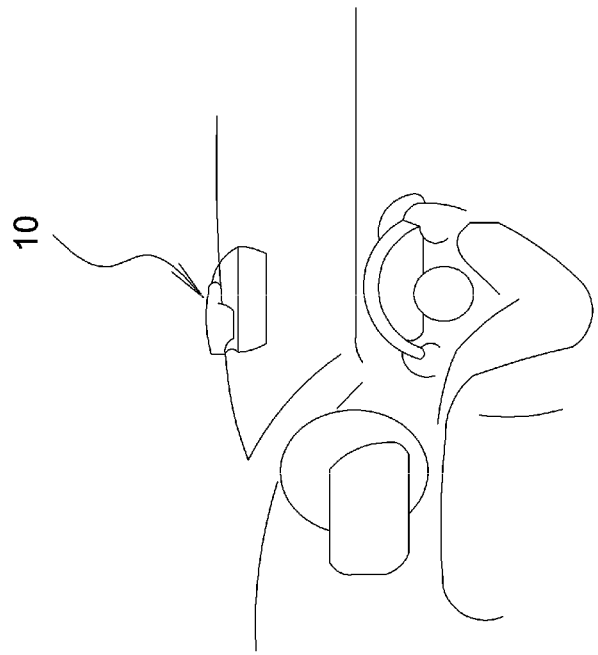

In an alternate embodiment, a vehicle such as a car may be equipped with the vehicle head-up display device 10 through roof mounting, as shown in FIG. 7B, and the roof-mounting head-up display device 10 may support a horizontal field of view of 6-12 degrees. For example, the head-up display device 10 may support a horizontal field of view of about 9.5 degrees, a horizontal width Eh of an eye-box is about 100 mm, a width Ch of the combiner 14 is about 189.5-233.45 mm, and a width Vh of the virtual image 22 is about 920.38-967.24 mm. Therefore, the efficiency factor Gh for a free-form combiner 14 may be in the range of 3.63≤Vh/Ch≤4.16. In another example, the head-up display device 10 may support a horizontal field of view of about 9.5 degrees, a horizontal width Eh of an eye-box is about 100 mm, a width Ch of the combiner 14 is about 233.95-281.14 mm, and a width Vh of the virtual image 22 is about 969.24-1020.79 mm. Therefore, the efficiency factor Gh for a free-form combiner 14 may be in the range of 4.17≤Vh/Ch≤4.85.

Figure 8A:
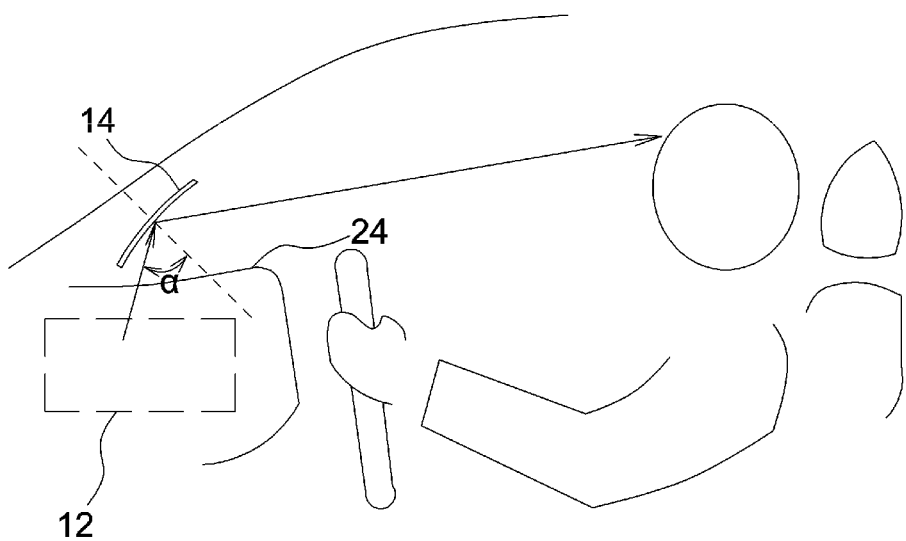
Figure 8B:
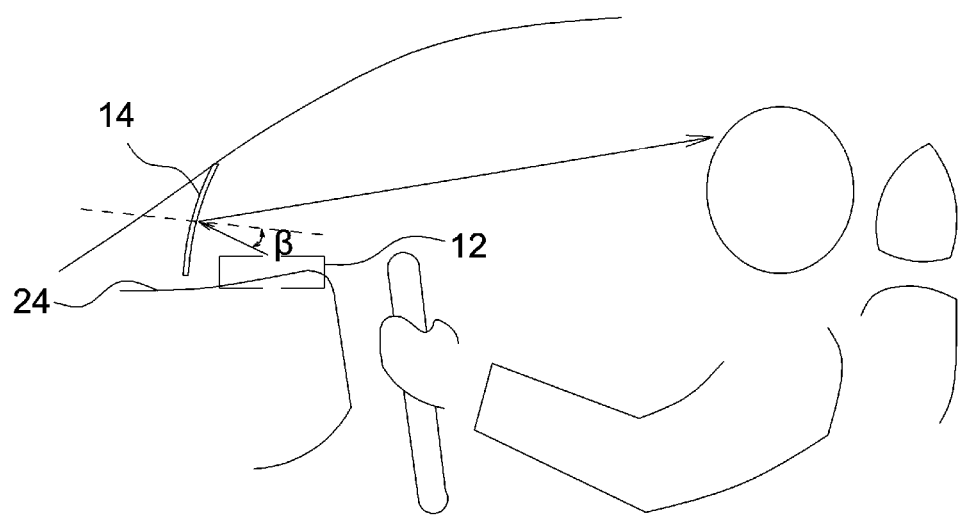

Further, an inclined angle of the combiner 14 may vary according to different mounting positions of the head-up display device 10. For example, as shown in FIG. 8A, when the pattern generation unit 12 of the head-up display device 10 is disposed inside a dashboard 24, a light beam emitted from the pattern generation unit 12 may be incident on the combiner 14 at an angle α of 60-70 degrees. In comparison, as shown in FIG. 8B when the pattern generation unit 12 of the head-up display device 10 is mounted on the dashboard 24, a light beam emitted from the pattern generation unit 12 may be incident on the combiner 14 at an angle β of 18-26 degrees.

According to the above embodiments, as compared with a spherical surface lens or an aspheric surface lens, the combiner 14 comprised of a free-form surface lens is allowed to minimize the size of light spots to increase the resolution of the virtual image 22 seen by the observer 16 and reduce the dynamic distortion among different viewpoints in an eye-box. Therefore, when the observer 16 freely moves to different positions of the eye-box, he may correctly recognize the displayed information because the symbols, numbers and letters displayed on the virtual image may maintain their original geometrical rationality. Besides, an efficiency factor as well as its proper range is defined for the free-form combiner 14 to optimize the size of the combiner 14 and the scope of the virtual image 22.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A vehicle head-up display device, comprising:
   a pattern generation unit for forming at least one image; and
   a combiner comprised of a free-form surface lens for magnifying and reflecting the image of the pattern generation unit to provide a virtual image, wherein the combiner has a dynamic distortion of smaller than 0.4%, with the dynamic distortion being an average value of a maximum horizontal dynamic distortion and a maximum vertical dynamic distortion, and the condition 1.97≤Vh/Ch≤1.99 or 2.01≤Vh/Ch≤2.09 is satisfied, where Ch denotes a width of the combiner and Vh denotes a width of the virtual image measured in the same horizontal plane as the width of the combiner.

2. The vehicle head-up display device as claimed in claim 1, wherein the vehicle head-up display device supports a horizontal field of view of about 2-10 degrees.

3. The vehicle head-up display device as claimed in claim 1, wherein the width of the combiner is about 145.72-156.33 mm or about 157.33-169.89 mm, and the width of the virtual image is about 303.97-313.45 mm or about 315.45-335.41 mm.

4. The vehicle head-up display device as claimed in claim 1, wherein the vehicle head-up display device is mounted on a dashboard of a vehicle, and a light beam emitted from the pattern generation unit is incident on the combiner at an angle of 18-26 degrees.

5. The vehicle head-up display device as claimed in claim 1, wherein the vehicle head-up display device is disposed inside a dashboard of a vehicle, and a light beam emitted from the pattern generation unit is incident on the combiner at an angle of 60-70 degrees.

6. The vehicle head-up display device as claimed in claim 1, wherein the pattern generation unit comprises an optical projection engine, a mirror and a diffuser, the optical projection engine emit an image beam, and the mirror deflects the image beam to pass through the diffuser.

7. The display device for vehicles according to claim 1, wherein the position of the virtual image outside the vehicle varies according to a distance between the pattern generation unit and the combiner.

8. The display device for vehicles according to claim 1, wherein the dynamic distortion is obtained by measuring variations in vertical and horizontal characteristic lengths of different images formed on the combiner corresponding to different viewpoints in an eye-box.

9. The display device for vehicles according to claim 8, wherein each of the variations in characteristic lengths is defined as a difference between a maximum horizontal length and a minimum horizontal length divided by the maximum horizontal length, or a difference between a maximum vertical length and a minimum vertical length divided by the maximum vertical length.

10. A vehicle head-up display device, comprising:
   a pattern generation unit for forming at least one image; and
   a combiner comprised of a free-form surface lens for magnifying and reflecting the image of the pattern generation unit to provide a virtual image, wherein the combiner has a dynamic distortion of smaller than 0.4%, with the dynamic distortion being an average value of a maximum horizontal dynamic distortion and a maximum vertical dynamic distortion, and the condition 3.63≤Vh/Ch≤4.16 or 4.17≤Vh/Ch≤4.85 is satisfied, where Ch denotes a width of the combiner and Vh denotes a width of the virtual image measured in the same horizontal plane as the width of the combiner.

11. The vehicle head-up display device as claimed in claim 10, wherein the vehicle head-up display supports a horizontal field of view of about 6-12 degrees.

12. The vehicle head-up display device as claimed in claim 10, wherein the width of the combiner is about 189.5-233.45 mm or about 233.95-281.14 mm, and the width of the virtual image is about 920.38-967.24 mm or about 969.24-1020.79 mm.

13. The vehicle head-up display device as claimed in claim 10, wherein the vehicle head-up display device is equipped to a vehicle through roof mounting.

14. The vehicle head-up display device as claimed in claim 10, wherein the pattern generation unit comprises an optical projection engine, a mirror and a diffuser, the optical projection engine emit an image beam, and the mirror deflects the image beam to pass through the diffuser.

15. The display device for vehicles according to claim 10, wherein the position of the virtual image outside the vehicle varies according to a distance between the pattern generation unit and the combiner.

16. The display device for vehicles according to claim 10, wherein the dynamic distortion is obtained by measuring variations in characteristic lengths of different images formed on the combiner corresponding to different viewpoints in an eye-box.

17. The display device for vehicles according to claim 16, wherein each of the variations in characteristic lengths is defined as a difference between a maximum horizontal length and a minimum horizontal length divided by the maximum horizontal length, or a difference between a maximum vertical length and a minimum vertical length divided by the maximum vertical length.

18. A combiner for a vehicle head-up display device, the combiner comprising a concave free-form surface lens for magnifying and reflecting an image projected from a pattern generation unit to provide a virtual image outside a vehicle, wherein the combiner has a dynamic distortion of smaller than 0.4%, the dynamic distortion is an average value of a maximum horizontal dynamic distortion and a maximum vertical dynamic distortion, the horizontal dynamic distortion is obtained by measuring variations in horizontal lengths of different images formed on the combiner corresponding to different viewpoints in an eye-box, and the vertical dynamic distortion is obtained by measuring variations in vertical lengths of the different images formed on the combiner corresponding to the different viewpoints in the eye-box.

19. The combiner as claimed in claim 18, wherein the condition $1.97 \leq Vh/Ch \leq 1.99$ or $2.01 \leq Vh/Ch \leq 2.09$ is satisfied, where Ch denotes a width of the combiner and Vh denotes a width of the virtual image measured in the same horizontal plane as the width of the combiner.

20. The combiner as claimed in claim 18, wherein the condition $3.63 \leq Vh/Ch \leq 4.16$ or $4.17 \leq Vh/Ch \leq 4.85$ is satisfied, where Ch denotes a width of the combiner and Vh denotes a width of the virtual image measured in the same horizontal plane as the width of the combiner.

* * * * *